United States Patent
Bor et al.

(10) Patent No.: US 12,502,314 B2
(45) Date of Patent: Dec. 23, 2025

(54) GENERATING BUBBLE JETS TO FRAGMENT AND REMOVE EYE FLOATERS

(71) Applicant: Alcon Inc., Fribourg (CH)

(72) Inventors: Zsolt Bor, San Clemente, CA (US); Alireza Malek Tabrizi, Irvine, CA (US); Raul Mauricio, Mission Viejo, CA (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 18/049,199

(22) Filed: Oct. 24, 2022

(65) Prior Publication Data

US 2023/0157888 A1  May 25, 2023

Related U.S. Application Data (60) Provisional application No. 63/281,326, filed on Nov. 19, 2021.

(51) Int. Cl.
*A61F 9/008* (2006.01)

(52) U.S. Cl.
CPC .. *A61F 9/0084* (2013.01); *A61F 2009/00846* (2013.01); *A61F 2009/00863* (2013.01); *A61F 2009/00874* (2013.01); *A61F 2009/00878* (2013.01); *A61F 2009/00885* (2013.01)

(58) Field of Classification Search
CPC .......... A61F 9/0084; A61F 2009/00846; A61F 2009/00863; A61F 2009/00874; A61F 2009/00878; A61F 2009/00885; A61F 2009/00897; A61F 9/00825
See application file for complete search history.

(56) References Cited

U.S. PATENT DOCUMENTS

| | | | |
|---|---|---|---|
| 3,780,979 A | 12/1973 | De Guillebon |
| 4,357,088 A | 11/1982 | Pomerantzeff |
| 5,312,396 A | 5/1994 | Feld |

(Continued)

FOREIGN PATENT DOCUMENTS

| | | | |
|---|---|---|---|
| AU | 2018274939 B2 | 6/2020 |
| CN | 210009227 U | 2/2020 |

(Continued)

OTHER PUBLICATIONS

Blake F. Webb, et al.; "Prevalence of vitreous floaters in a community sample of smartphone users"; Internat'l Journal of Ophthalmology; Jun. 18, 2013; pp. 402-405; 6(3); PMC/ US National Library of Medicine National Institutes of Health.

(Continued)

*Primary Examiner* — Jennifer Pitrak McDonald
*Assistant Examiner* — Christopher J Mutchler
(74) *Attorney, Agent, or Firm* — Patterson + Sheridan, LLP (57) ABSTRACT

In certain embodiments, an ophthalmic laser system for treating a floater in a vitreous of an eye includes a laser device that directs laser pulses towards the floater to yield cavitation bubbles that create a bubble jet to treat the floater. In some examples, the laser device includes a beam multiplexer that splits a laser beam into multiple beams that form the cavitation bubbles that create the bubble jet. In some examples, the laser device directs laser pulses towards the floater according to a pulse pattern that forms the cavitation bubbles that create the bubble jet.

9 Claims, 8 Drawing Sheets

(56) References Cited

U.S. PATENT DOCUMENTS

| | | |
|---|---|---|
| 5,909,270 A | 6/1999 | Moser |
| 6,142,630 A | 11/2000 | Koester |
| 6,322,556 B1 | 11/2001 | Gwon |
| 6,789,900 B2 | 9/2004 | Van De Velde |
| 7,297,288 B1* | 11/2007 | LeClair ................ A61B 18/26 216/52 |
| 7,374,287 B2 | 5/2008 | Van De Velde |
| 7,510,282 B2 | 3/2009 | Ueno |
| 7,520,613 B2 | 4/2009 | Saito et al. |
| 7,703,922 B2 | 4/2010 | Van De Velde |
| 8,480,659 B2 | 7/2013 | Frey et al. |
| 8,652,602 B1 | 2/2014 | Dolla |
| 8,783,868 B2 | 7/2014 | Qiu |
| 8,876,808 B2 | 11/2014 | Feklistov et al. |
| 8,994,753 B2 | 3/2015 | Nakano |
| 9,033,500 B2 | 5/2015 | Utsunomiya |
| 9,603,519 B2 | 3/2017 | Bor et al. |
| 9,675,243 B2 | 6/2017 | Sasak et al. |
| 9,789,002 B2 | 10/2017 | Van De Velde |
| 10,130,511 B2 | 11/2018 | Dantus |
| 10,478,342 B2 | 11/2019 | Dick |
| 10,555,835 B2 | 2/2020 | Schuele et al. |
| 2004/0004055 A1* | 1/2004 | Barros ................ A61B 18/26 216/13 |
| 2007/0258094 A1 | 11/2007 | Izatt et al. |
| 2007/0291277 A1 | 12/2007 | Everett |
| 2008/0114386 A1* | 5/2008 | Iliakis ................ G16H 20/40 606/4 |
| 2009/0000665 A1* | 1/2009 | Oshemkov ............ A61B 18/26 137/830 |
| 2009/0073384 A1 | 3/2009 | Warden |
| 2009/0137989 A1 | 5/2009 | Kataoka |
| 2009/0171327 A1* | 7/2009 | Kurtz ................ A61F 9/009 606/6 |
| 2009/0196477 A1 | 8/2009 | Cense et al. |
| 2010/0123873 A1 | 5/2010 | Raymond |
| 2010/0152847 A1 | 6/2010 | Padrick |
| 2011/0077557 A1 | 3/2011 | Wing et al. |
| 2012/0281235 A1 | 11/2012 | Murata |
| 2013/0131652 A1 | 5/2013 | Dick |
| 2013/0173029 A1 | 7/2013 | Caldeira et al. |
| 2014/0058367 A1 | 2/2014 | Dantus |
| 2014/0216468 A1 | 8/2014 | Goldshleger |
| 2014/0257257 A1 | 9/2014 | Grant et al. |
| 2014/0268036 A1 | 9/2014 | Ketterling et al. |
| 2014/0276674 A1 | 9/2014 | Lee |
| 2015/0190278 A1 | 7/2015 | Gooding |
| 2015/0342678 A1* | 12/2015 | Deladurantaye ........ A61F 9/008 606/5 |
| 2015/0342782 A1 | 12/2015 | Mordaunt |
| 2016/0058617 A1 | 3/2016 | Luttrull et al. |
| 2016/0074214 A1 | 3/2016 | Palanker et al. |
| 2016/0074221 A1 | 3/2016 | Tassignon et al. |
| 2016/0166431 A1* | 6/2016 | Vogler ................ A61F 9/0084 606/5 |
| 2016/0227999 A1 | 8/2016 | An et al. |
| 2016/0235588 A1 | 8/2016 | Hart et al. |
| 2016/0256324 A1 | 9/2016 | Suzuki |
| 2016/0278629 A1 | 9/2016 | Schuele |
| 2016/0302969 A1 | 10/2016 | Yamamoto |
| 2017/0181625 A1 | 6/2017 | Kawakami et al. |
| 2017/0252213 A1 | 9/2017 | Furuuchi et al. |
| 2017/0326003 A1 | 11/2017 | Schuele et al. |
| 2018/0028354 A1 | 2/2018 | Heeren |
| 2018/0028355 A1* | 2/2018 | Raksi ................ A61B 3/13 |
| 2018/0140257 A1 | 5/2018 | Govindjee et al. |
| 2018/0206719 A1 | 7/2018 | Adler et al. |
| 2018/0317767 A1 | 11/2018 | Ryan |
| 2018/0353064 A1 | 12/2018 | Soetikno et al. |
| 2018/0360657 A1* | 12/2018 | Bor ................ G02B 27/1086 |
| 2018/0368915 A1 | 12/2018 | Xia et al. |
| 2019/0159933 A1 | 5/2019 | Romano et al. |
| 2019/0282403 A1 | 9/2019 | Barrett et al. |
| 2019/0290124 A1 | 9/2019 | Laforest et al. |
| 2019/0290483 A1* | 9/2019 | Nobis ................ A61B 3/10 |
| 2019/0313903 A1 | 10/2019 | Mckinnon |
| 2019/0365569 A1 | 12/2019 | Skovgaard et al. |
| 2020/0038241 A1 | 2/2020 | Wang et al. |
| 2020/0060873 A1 | 2/2020 | Heeren |
| 2020/0085292 A1 | 3/2020 | Fukuma et al. |
| 2020/0129336 A1 | 4/2020 | Schuele et al. |
| 2020/0130103 A1 | 4/2020 | Choi |
| 2020/0192080 A1 | 6/2020 | Karam |
| 2020/0196853 A1 | 6/2020 | Van Hemert et al. |
| 2020/0273218 A1 | 8/2020 | Camino et al. |
| 2020/0397289 A1 | 12/2020 | Ralston |
| 2020/0400422 A1 | 12/2020 | Ralston |
| 2021/0100450 A1 | 4/2021 | Amma |
| 2021/0186753 A1 | 6/2021 | Al-Qaisi et al. |
| 2021/0275009 A1 | 9/2021 | Yates et al. |
| 2021/0378507 A1 | 12/2021 | Wallace |
| 2021/0386586 A1 | 12/2021 | Bor |
| 2022/0012459 A1 | 1/2022 | Schwiegerling |
| 2022/0031511 A1 | 2/2022 | Charles et al. |
| 2023/0157889 A1 | 5/2023 | Bor |

FOREIGN PATENT DOCUMENTS

| | | |
|---|---|---|
| CN | 108371542 B | 4/2020 |
| CN | 109196333 B | 12/2020 |
| CN | 111281651 B | 12/2020 |
| CN | 112862782 A | 5/2021 |
| CN | 112587302 B | 6/2021 |
| CN | 112587304 B | 6/2021 |
| DE | 19705044 A1 | 8/1998 |
| DE | 102019007147 A1 | 4/2021 |
| DE | 102019007148 A1 | 4/2021 |
| EP | 0770370 A2 | 2/1997 |
| EP | 1212022 B1 | 3/2005 |
| EP | 1563785 A1 | 8/2005 |
| EP | 1638452 B1 | 10/2006 |
| EP | 1838212 A1 | 10/2007 |
| EP | 2144552 A1 | 1/2010 |
| EP | 1928297 B1 | 11/2010 |
| EP | 2459138 A2 | 6/2012 |
| EP | 2525706 A2 | 11/2012 |
| EP | 2898820 A1 | 7/2015 |
| EP | 3061429 A1 | 8/2016 |
| EP | 2890340 B1 | 2/2017 |
| EP | 3459487 A1 | 3/2019 |
| EP | 3501463 A1 | 6/2019 |
| EP | 3636137 A1 | 4/2020 |
| EP | 3861924 A1 | 8/2021 |
| GB | 2469249 A | 10/2010 |
| JP | 5767014 B2 | 6/2015 |
| JP | 2017176558 A | 10/2017 |
| JP | 6410468 B2 | 10/2018 |
| JP | 2018196821 A | 12/2018 |
| JP | 2018196822 A | 12/2018 |
| JP | 2020022569 A | 2/2020 |
| JP | 6736304 B2 | 7/2020 |
| JP | 6839902 B2 | 2/2021 |
| RU | 2661016 C1 | 7/2018 |
| RU | 2692666 C1 | 6/2019 |
| RU | 2695629 C1 | 7/2019 |
| RU | 2710058 C2 | 12/2019 |
| RU | 2726468 C1 | 7/2020 |
| WO | 9958047 A1 | 11/1999 |
| WO | 0137769 A1 | 5/2001 |
| WO | 0195791 A1 | 12/2001 |
| WO | 2007059189 A2 | 5/2007 |
| WO | 2009033110 A2 | 3/2009 |
| WO | 2009036104 A2 | 3/2009 |
| WO | 2009039315 A2 | 3/2009 |
| WO | 2009059400 A1 | 5/2009 |
| WO | 2010117386 A1 | 10/2010 |
| WO | 2014053824 A1 | 4/2014 |
| WO | 2015131135 A1 | 9/2015 |
| WO | 2015171793 A1 | 11/2015 |
| WO | 2016033590 A1 | 3/2016 |
| WO | 2017062673 A1 | 4/2017 |
| WO | 2017196306 A1 | 11/2017 |
| WO | 2017205857 A1 | 11/2017 |

(56) References Cited

FOREIGN PATENT DOCUMENTS

| | | |
|---|---|---|
| WO | 2020074532 A1 | 4/2020 |
| WO | 2020180729 A1 | 9/2020 |
| WO | 2020215359 A1 | 10/2020 |
| WO | 2020216763 A1 | 10/2020 |
| WO | 2020257711 A1 | 12/2020 |
| WO | 2021023799 A1 | 2/2021 |
| WO | 2021049243 A1 | 3/2021 |
| WO | 2021066047 A1 | 4/2021 |
| WO | 2021092211 A1 | 5/2021 |
| WO | 2021183637 A1 | 9/2021 |
| WO | 2022149028 A1 | 7/2022 |
| WO | 2023089416 A1 | 5/2023 |
| WO | 2023089459 A1 | 5/2023 |
| WO | 2023097391 A1 | 6/2023 |

OTHER PUBLICATIONS

Chirag P. Shah, et al., YAG Laser Vitreolysis vs Sham YAG Vitreolysis for Symptomatic Vitreous Floaters A Randomized Clinical Trial, JAMA Ophthalmology, Sep. 2017, 918-923, 135-9.
ELLEX Website, Treatment Guidelines—Laser Floater Removal; 2016, Ellex Medical Pty Ltd. E&OE. VB0002E, downloaded Apr. 20, 2017.
Felix Sauvage et al: "Photoablation of Human Vitreous Opacitiesby Light-Induced Vapor Nanobubbles", ACS Nano, vol. 13, No. 7, Jul. 9, 2019, pp. 8401-8416.
Kim Jihwan et al. "Nonmechanical Laser Beam Steering Based on Polymer Polarization Gratings: Design Optimization and Demonstration", Journal of Lightwave Technology, vol. 33, No. 10, pp. 2068-2077, May 15, 2015.
Michael J. Escuti, et al., "Geometric-Phase Holograms"; Optics & Photonics News, pp. 22-29, Feb. 2016.
Milston Rebecca et al: "Vitreous floaters: Etiology, diagnostics, and management", Survey of Ophthalmology, vol. 61, No. 2, Mar. 1, 2016, pp. 211-227.
Nicusor Iftimia et al: "Hybrid retinal imaginer using line-scanning laser ophthalmoscopy and spectral domain optical coherence tomography", Optics Express, vol. 14, No. 26, Dec. 22, 2006.
Reece Bergstrom, et al., Vitreous Floaters, National Center for Biotechnology Information, May 21, 2020, 4 pages, Bookshelf ID NBK470420, StatPearls Publishing LLC, online.
Wikipedia Encyclopedia, Floater, Wikipedia Encyclopedia, Mar. 29, 2021, online: https://en.wikipedia.org/wiki/rloater?wprov=sfti 1.
Zhang Yunbo et al: "Parallel large-range scanning confocal microscope based on a digital micromirror device", Optik vol. 124, No. 13 (2013), Aug. 4, 2012, pp. 1585-1588.
Damodaran et al., "Digital micromirror device based ophthalmoscope with concentric circle scanning", 2017, pp. 2766-2780, vol. 8, No. 5, Biomedical Optics Express.
Fischer et al., "Scanning Laser Ophthalmoscopy (SLO)", In: Bille JF, editor. High Resolution Imaging in Microscopy and Ophthalmology: New Frontiers in Biomedical Optics [Internet], Aug. 14, 2019, accessed on Jan. 30, 2023 from https://www.ncbi.nlm.nih.gov/books/NBK554043, Springer.
Ginner et al., "Wide-Field OCT Angiography at 400 KHz Utilizing Spectral Splitting", Photonics, Oct. 23, 2014, pp. 369-379, vol. 1, No. 4.
Heidelberg Engineering GMBH, "Spectralis. Hardware Operating Instructions," Version 001, Aug. 2007.
Heidelberg Engineering, "Spectralis. Multimodal Imaging Platform Optimized for the Posterior Segment", accessed on Jan. 30, 2023 from https://business-lounge.heidelbergengineering.com/us/en/products/spectralis/spectralis/.
Hofer et al., "Dispersion encoded full range frequency domain optical coherence tomography", Jan. 5, 2009, pp. 7-24, vol. 17, No. 1, Optics Express, US.
Hofer et al., "Fast dispersion encoded full range optical coherence tomography for retinal imaging at 800 nm and 1060 nm", Mar. 1, 2010, pp. 4898-4919, vol. 18, No. 5, Optics Express.

Leitgeb et al., "Complex ambiguity-free Fourier domain optical coherence tomography through transverse scanning", 2007, pp. 3453-3455, vol. 32, Optics Letters.
Li et al., "DMD-based three-dimensional chromatic confocal microscopy", 2020, pp. 4349-4356, vol. 59, No. 14, Applied Optics.
Martial et al., "Programmable Illumination and High-Speed, Multi-Wavelength, Confocal Microscopy Using a Digital Micromirror", Aug. 2012, e43942, vol. 7, No. 8, PLOS One.
Reznicek Lukas et al., "Wide-Field Megahertz OCT Imaging of Patients with Diabetic Retinopathy", Journal of Diabetes Research, 2015, 5 pages.
Ruggeri et al., "Imaging and full-length biometry of the eye during accommodation using spectral domain OCT with an optical switch", Jul. 1, 2012, pp. 1506-1520, vol. 3, No. 7, Biomedical Optics Express.
Sarunic et al., "Instantaneous complex conjugate resolved spectral domain and swept-source OCT using 3×3 fiber couplers", Feb. 2005, pp. 957-967, vol. 13, No. 3, Optics Express.
Shields et al., "Wide-angle Imaging of the Ocular Fundus", Review of the Ophthalmology, Feb. 15, 2003.
Singh, "Lasers Take Aim at Floaters", Ophthalmology Management, Jul. 1, 2019, pp. 38, 40-42, 59, vol. 23.
Singh, "Modern vitreolysis—YAG laser treatment now a real solution for the treatment of symptomatic floaters", Survey of Ophthalmology, Mar. 3, 2020, pp. 581-591, vol. 65, No. 5.
SunLED, NanoPoint-0201 Series LEDs, published Feb. 15, 2016, www.SunLEDusa.com.
Volk Optical, "Volk Idrees Mid-Vitreous Lens", Dec. 20, 2020, accessed on Dec. 20, 2020 from https://www.volk.com/...s?pr_prod_strat=collection_fallback&pr_rec_pid=4513049018402&pr_ref_pid=4513048952866&pr_seq=uniform.
Volk Optical, "Volk Singh Mid-Vitreous Lens", Dec. 20, 2020, accessed on Dec. 20, 2020 from https://www.volk.com/products/singh-mid-vitreous-vitreous-slit-lamp-lens?_pos=3&amp;amp;_sid=b50c0674f&amp;amp;_ss=r >.
Wang et al., "In vivo full range complex Fourier domain optical coherence tomography", Jan. 30, 2007, 054103, vol. 90, Applied Physics Letters.
Wojtkowski et al., "Full range complex spectral optical coherence tomography technique in eye imaging", 2002, pp. 1415-1417, vol. 27, No. 16, Optics Letters.
Yasuno et al., "Simultaneous B-M-mode scanning method for real-time full-range Fourier domain optical coherence tomography", 2006, pp. 1861-1865, vol. 45, No. 8, Applied Optics.
Zhang et al., Removal of a mirror image and enhancement of the signal-to-noise ratio in Fourier-domain optical coherence tomography using an electro-optic phase modulator, Jan. 15, 2005, vol. 30, No. 2, Optics Letters.
Zhou et al., "Dual channel dual focus optical coherence tomography for imaging accommodation of the eye", May 25, 2009, pp. 8947-8955, vol. 17, No. 11, Optics Express.
Adrian G.H. Podoleanu et al., Combined optical coherence tomograph and scanning laser ophthalmoscope mi nije dostupan besplatno., Electronics Letters, 34 (11), 1998.
Chi-Hung Lee, et al., Imaging vitreous floaters and cataracts with optical simulations, Optik, 194, 1-9, 2019.
Christy K. Sheehy et al., High-speed, image-based eye tracking with a scanning laser ophthalmoscope, Biomedical Optics Express, vol. 3, No. 10, 2012.
D. H. Kelly, "Retinal Inhomogeneity. II. Spatial Summation," J. Opt. Soc. Am., pp. 114-119, vol. 1, No. 1 (Jan. 1984).
D. H. Kelly, "Retinal Inhomogeneity. III. Circular-Retina Theory," D.H. Kelly, J. Opt. Soc. Am., pp. 810-819, vol. 2, No. 6 (Jun. 1985).
D.H. Kelly, "Visual Processing of Moving Stimuli," J. Opt. Soc. Am., pp. 216-225, vol. 2, No. 2 (Feb. 1985).
D.H. Kelly,, "Motion and Vision. II. Stabilized Spatio-Temporal Threshold Surface," J. Opt. Soc. Am., pp. 1340-1349, vol. 69, No. 10 (Oct. 1979).
D.H.Kelly, "Retinal Inhomogeneity. I. Spatiotemporal Contrast Sensitivity," J. Opt. Sec. Am., pp. 107-113, vol. 1, No. 1 (Jan. 1984).
Mojana F. et al.. Observations by spectral-domain optical coherence tomography combined with simultaneous scanning laser (56) References Cited

OTHER PUBLICATIONS ophthalmoscopy: imaging of the vitreous, American Journal of Ophthalmol. Apr. 2010;149(4):641-650.
Nidek, Scanning Laser Ophthalmoscope Mirante SLO/OCT Mirante SLO, https://www.nidek-intl.com/product/ophthaloptom/diagnostic/dia_retina/mirante.htm.
Peter G. J. Barten, "Contrast Sensitivity of the Human Eye and its Effects on Image Quality," Chapter 3, pp. 27-40, Model for the spatial contrast sensitivity of the eye, (1999).
Pointer, J. S., & Hess, R. F. "The contrast sensitivity gradient across the human visual field: With emphasis on the low spatial frequency range,", R. F. Vision Research, 29(9), 1133-1151 (1989).
Sebag J et al., Vitreous and Vitreoretinal Interface, Ch. 21, 2015.
Sebag J., Vitreous and Vision Degrading Myodesopsia. Progress in Retinal and Eye Research Nov. 2020;79.
T Ivanova et al, Vitrectomy for primary symptomatic vitreous opacities: an evidence-based review, Eye (Lond) May 2016;30(5):645-55.
Teri T Kleinberg et al., Vitreous substitutes: a comprehensive review, Survey of Ophthalmology, 56 (4), 2011.

\* cited by examiner

GENERATING BUBBLE JETS TO FRAGMENT AND REMOVE EYE FLOATERS

TECHNICAL FIELD

The present disclosure relates generally to laser vitreolysis systems, and more particularly to generating bubble jets to fragment and remove eye floaters.

BACKGROUND

Eye floaters are microscopic collagen fibers that can clump and cast shadows on the retina, which disturb the vision of the patient. In laser vitreolysis, a laser beam is directed into the vitreous to treat eye floaters. The laser beam may be used to disintegrate the floaters to improve vision.

BRIEF SUMMARY

In certain embodiments, an ophthalmic laser system for treating a floater in a vitreous of an eye comprises a laser device, an ophthalmic microscope, and a computer. The laser device directs laser pulses towards the floater in the vitreous of the eye. The laser device includes a laser that generates a laser beam, and a beam multiplexer that splits the laser beam into beams that form cavitation bubbles to create a bubble jet in the vitreous of the eye. The ophthalmic microscope provides an image of a shadow cast by the floater onto a retina of the eye. The computer instructs the laser device to direct the beams towards the floater in the vitreous in order to create the bubble jet to treat the floater.

Embodiments may include none, one, some, or all of the following features:

The beam multiplexer comprises an optical device selected from the following: a diffractive optical element (DOE), a holographic optical element (HOE), a spatial light modulator (SLM), a polarizing prism, a beam amplitude splitting interferometer, a wavefront splitting interferometer, or a birefringent optical component.

The beam multiplexer includes a wave plate that alters a polarization state of the laser beam, and a prism that separates the laser beam into the beams. The wave plate may be a half-wave plate that shifts the polarization state of the laser beam. The prism may be a Wollaston prism that separates the laser beam into the beams with orthogonal polarization.

The beam multiplexer splits the laser beam into the beams that form the cavitation bubbles with a bubble center separation of 5 to 20 microns.

The beam multiplexer creates a first cavitation bubble with a first diameter and a second cavitation bubble with a second diameter, where the second diameter is different from the first diameter.

The computer instructs the laser device to direct the beams to form the cavitation bubbles arranged to direct the bubble jet in a particular direction.

The computer instructs the laser device to direct the beams to form the cavitation bubbles arranged in a spiral enface pattern.

The computer instructs the laser device to direct the beams to form the cavitation bubbles arranged in a raster enface pattern.

In certain embodiments, an ophthalmic laser system for treating a floater in a vitreous of an eye comprises a laser device, a floater detection system, and a computer. The laser device directs laser pulses towards the floater in the vitreous of the eye. The floater detection system detects the floater in the vitreous. The computer accesses a pulse pattern for the laser pulses, where the pulse pattern yields cavitation bubbles that create a bubble jet in the vitreous of the eye. The computer instructs the laser device to direct the laser pulses towards the floater according to the pulse pattern to create the bubble jet to treat the floater.

Embodiments may include none, one, some, or all of the following features:

The computer instructs the laser device to: create a first cavitation bubble with a first diameter, and create a second cavitation bubble with a second diameter, where the second diameter is different from the first diameter.

The computer instructs the laser device to direct the laser pulses to form the cavitation bubbles arranged to direct the bubble jet in a particular direction.

The pulse pattern yields the cavitation bubbles with a bubble center separation of 5 to 20 microns.

The pulse pattern comprises pulse groups, where each pulse group yields a set of cavitation bubbles that form a bubble jet.

The pulse pattern yields the cavitation bubbles arranged in a spiral enface pattern.

The pulse pattern yields the cavitation bubbles arranged in a raster enface pattern.

The floater detection system configured to determine a location of the floater in the vitreous of the eye.

The laser device includes a laser that generates a laser beam and a beam multiplexer that splits the laser beam into the laser pulses that form the cavitation bubbles to create the bubble jet.

The ophthalmic laser system includes an xy-scanner that: receives a detection beam from the floater detection system and directs the detection beam along a detection beam path towards a floater shadow cast by the floater on a retina of the eye; and receives the laser pulses from the laser device and directs the laser pulses along the detection beam path towards the floater shadow.

DESCRIPTION OF EXAMPLE EMBODIMENTS

Referring now to the description and drawings, example embodiments of the disclosed apparatuses, systems, and methods are shown in detail. The description and drawings are not intended to be exhaustive or otherwise limit the claims to the specific embodiments shown in the drawings and disclosed in the description. Although the drawings represent possible embodiments, the drawings are not necessarily to scale and certain features may be simplified, exaggerated, removed, or partially sectioned to better illustrate the embodiments.

Laser vitreolysis can be performed to treat eye floaters in an eye. Current laser systems, however, fail to effectively and efficiently fragment and remove floaters, resulting in prolonged surgical time and retinal radiation exposure. To improve floater removal, ophthalmic systems described herein have a laser device that directs laser pulses towards a floater in the eye. The laser pulses form cavitation bubbles to create a bubble jet that fragments the floater and moves the floater fragments away from the visual field. In some examples, the laser device includes a beam multiplexer that splits a laser beam into multiple beams that form the cavitation bubbles that create the bubble jet. In some examples, the laser device directs laser pulses towards the floater according to a pulse pattern that forms the cavitation bubbles that create the bubble jet. In certain embodiments, laser device directs the pulses to yield a pattern (e.g., a spiral or raster pattern) of bubble jets. In the embodiments, some pulses block floater movement, reducing the likelihood the floater will jump. Accordingly, certain embodiments improve the effectiveness and efficiency of floater fragmentation and removal.

1. Example Systems

Figure 1:
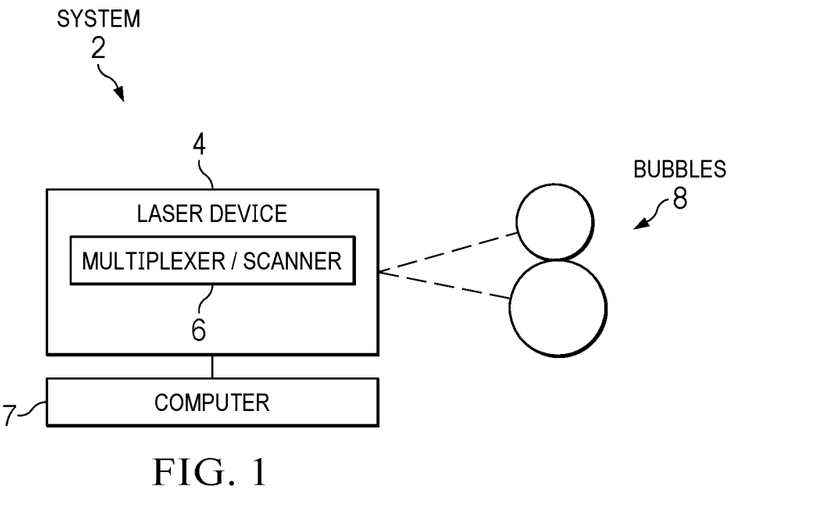
FIG. 1 illustrates a simplified example of an ophthalmic system that creates bubble jets to fragment and remove eye floaters from an eye, according to certain embodiments.

FIG. 1 illustrates a simplified example of an ophthalmic system 2 that creates bubble jets to treat, e.g., fragment and/or remove, eye floaters from an eye, according to certain embodiments. In the example, system 2 includes a laser device 4, a multiplexer and/or scanner (multiplexer/scanner) 6, and a computer 7, coupled as shown. For ease of explanation, an axis (e.g., optical or visual axis) of the eye approximates a z-axis, which in turn defines enface planes (e.g., xy-planes) substantially orthogonal to the z-axis. An enface pulse pattern (e.g., a spiral or raster enface pulse pattern) is a pulse pattern formed on an enface plane.

As an overview, laser device 4 generates a laser beam comprising laser pulses. Multiplexer/scanner 6 directs the laser pulses towards the vitreous of an eye. The laser pulses cause laser-induced optical breakdowns (LIOBs) that photodisrupt the vitreous and create rapidly expanding (and contracting) cavitation bubbles 8 that may expand and contract several times. Interaction between cavitation bubbles 8 creates a bubble jet, which is a forceful jet of water. Energy of the bubbles (such as energy of internal high-pressure gas and of surface tension forces) is converted into the kinetic energy of the bubble jet. If the bubbles are of different size, the direction of motion of the bubble jet is towards the smaller bubble. The bubble jet fragments the floater and moves the floater fragments away from the visual axis, i.e., the surgeon's visual field.

In certain embodiments, bubbles and/or bubble jets facilitate removal of the floater fragments. For example, if the patient's head is in an upright position during surgery, the cavitation bubbles can be oriented such that the resulting bubble jet is directed towards the upper part of the posterior chamber to move fragments away from the visual field. As another example, after floater fragmentation, residual tiny bubbles become entangled in the floater fragments, and the bubbles' buoyancy lift the fragments away from the visual field. As another example, after a cavitation bubble repeatedly expands and collapses a few times, the water vapor in the cavitation bubble condense into water and some gases (e.g., $H_2$, $O_2$, $CO_2$, and NOx) remain in the bubble. These gas bubbles become entangled with the floater fragments and lift the fragments to the uppermost part of the posterior chamber, typically in about one minute. After several minutes, the gas bubbles have been absorbed into the vitreous, and the fragments have moved away from the visual field.

Turning to the components, laser device 4 may comprise any suitable ultrashort (e.g., nanosecond, picosecond, or femtosecond) pulse laser device. Examples of laser device 22 include YAG lasers (e.g., a Q-switched nanosecond YAG laser, such as a frequency doubled Q-switched nanosecond YAG laser), picosecond lasers (e.g., a mode-locked picosecond laser operating in the 1 to 1.1 micron (μm) spectral range or their second harmonics or an ultrashort infrared (700 to 1500 nanometers (nm)) picosecond laser), femtosecond lasers (e.g., an infrared, an ultrashort infrared (700 to 1500 nanometers (nm)), or ultraviolet femtosecond laser), and single pulse to high repetition rate (10 megahertz (MHZ)) lasers. The laser beam may have any suitable wavelength (e.g., 400 to 2000 nanometers (nm)) and focal point (e.g., 3 to 10 microns (μm), such as 5 to 6 microns). The pulses may have any suitable duration (e.g., 20 femtoseconds (fs) to 1000 nanoseconds (ns)), repetition rate (e.g., 25 to 100 kilohertz (kHz), such as 50 kHz), and pulse energy (e.g., 1 microjoule (μJ) to 1 millijoule (mJ), such as 1 to 20 μJ or 1 to 10 μJ).

Multiplexer/scanner 6 may comprise a multiplexer and/or scanner. A multiplexer comprises any suitable optical device that can split (or otherwise modulate) the laser beam to yield multiple laser beams, where each beam creates a cavitation bubble in the vitreous. In general, an optical device is a component that can act on (e.g., transmit, reflect, refract, diffract, collimate, condition, shape, focus, modulate, and/or otherwise act on) light. Examples of beam multiplexers include a diffractive optical element (DOE) (e.g., a diffraction grating), a holographic optical element (HOE), a spatial light modulator (SLM) (e.g., an electrically addressable SLM), a polarizing prism (e.g., a Wollaston, Normarski, Rochon, or Senamont prism), a beam amplitude splitting interferometer (e.g., a Michelson, Mach-Zender, or Fizeau wedge interferometer), a wavefront splitting interferometer (e.g., a Lloyd mirror or Fresnel biprism), a birefringent optical component, or a combination of different beam multiplexers (e.g., 5× diffractive multiplexer and a Wollaston-doubler).

A scanner moves focal point of the laser beam to different locations of an enface plane to create cavitation bubbles in the vitreous. Examples of scanners include a galvo scanner (e.g., a pair of galvanometrically-actuated scanner mirrors that can be tilted about mutually perpendicular axes), an electro-optical scanner (e.g., an electro-optical crystal scanner) that can electro-optically steer the beam, or an acousto-optical scanner (e.g., an acousto-optical crystal scanner) that can acousto-optically steer the beam.

In the example, the pulses create any suitable number (e.g., two, three, four, or more) of cavitation bubbles 8. Cavitation bubbles 8 may be formed any suitable spatial and temporal distance apart that allows bubbles 8 to interact (e.g., come into contact) with each other. The spatial pulse separation may be selected according to the bubble diameter, which may be 150 micrometers (μm) to 2 millimeters (mm), depending on pulse energy. For example, a 10 microjoule (μJ) pulse may yield a 150 to 300 μm diameter; a 6 μJ pulse may yield a 254 μm diameter; and 1 mJ pulse may yield a 1 mm diameter. If a scanner forms cavitation bubbles 8, the scan rate (which determines the temporal separation) may be selected according to the lifetime of bubbles to yield bubbles that are sufficiently temporally close to interact. For example, the bubble lifetime may be approximately 0.1 to 0.3 milliseconds (ms). A scan rate of 50 kilo hertz (kHz) forms bubbles every 1/50 kHz=20 microseconds (μs), so neighboring bubbles are inflated long enough to interact.

Computer 7 controls components of system 2 in accordance with computer programs. For example, computer 7 instructs laser device 4 and multiplexer/scanner 6 focus laser pulses at the vitreous to create a bubble jet to fragment a floater or remove floater fragments.

1.1 Laser-Slit Lamp System

Figure 2A:
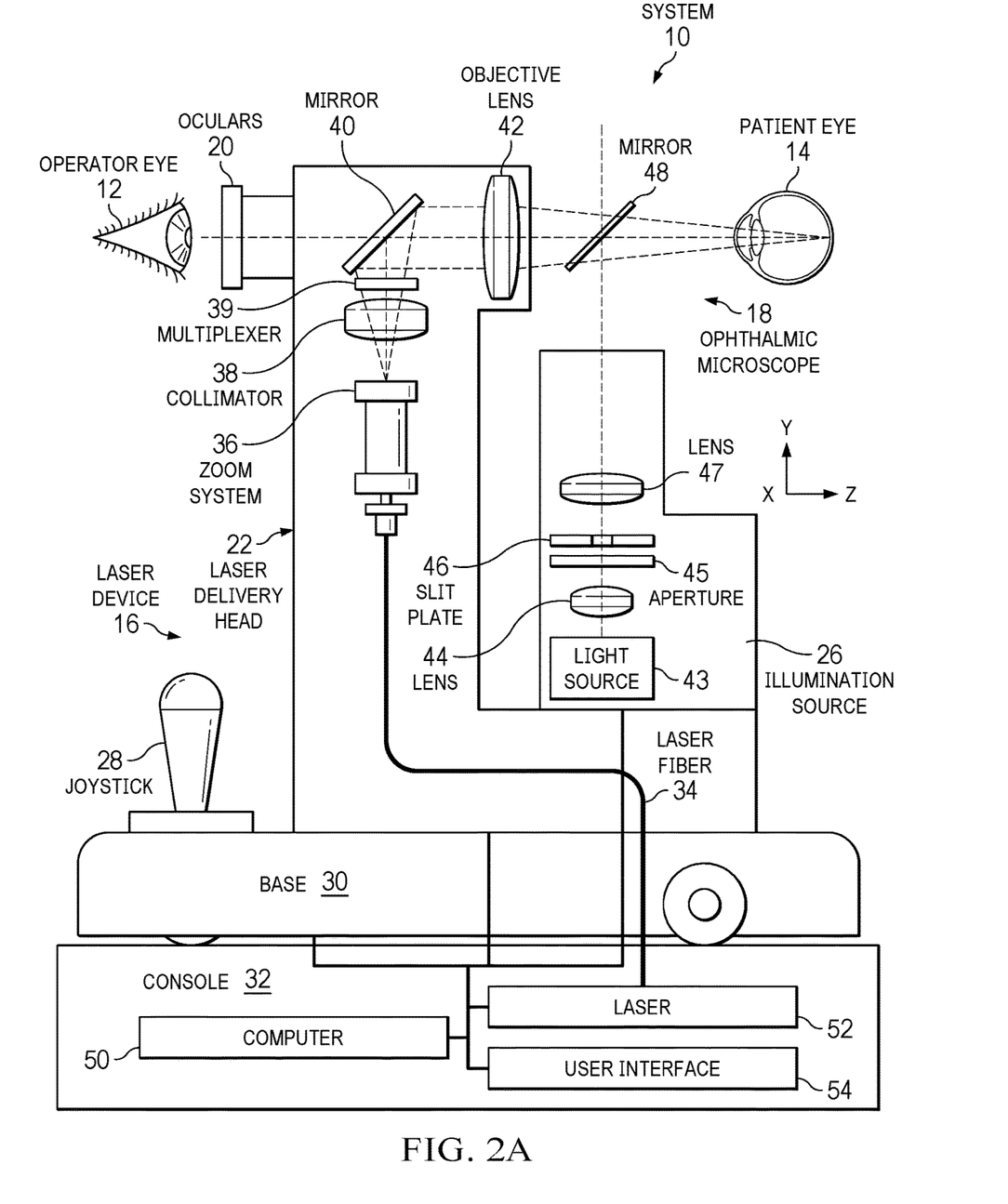
FIGS. 2A and 2B illustrate an example of an ophthalmic laser system with a beam multiplexer that can create cavitation bubbles to form a bubble jet, according to certain embodiments.
Figure 2B:
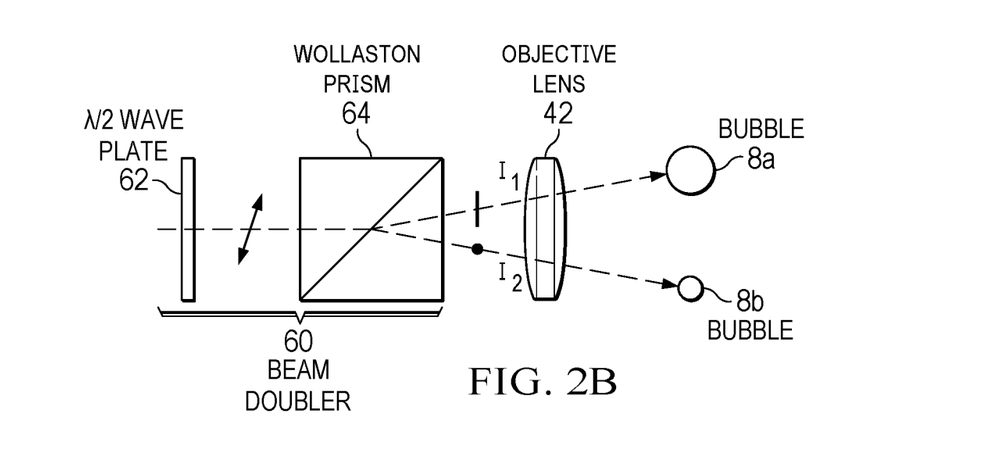

FIGS. 2A and 2B illustrate an example of an ophthalmic laser system 10 with a beam multiplexer that can create cavitation bubbles to form a bubble jet, according to certain embodiments. FIG. 2A illustrates an example of ophthalmic laser system 10 with a beam multiplexer. FIG. 2B illustrates an example of a beam multiplexer comprising a beam doubler 60 that may be used in system 10 of FIG. 2A.

In the example, ophthalmic laser system 10 allows an operator (with an operator eye 12) to see a floater within a patient eye 14. Ophthalmic laser system 10 comprises oculars 20, a laser delivery head 22, a slit illumination source 26, a positioning device (such as a joystick 28), a base 30, and a console 32, coupled as shown. Laser delivery head 22 includes a laser fiber 34, a zoom system 36, a collimator 38, a beam multiplexer 39, a mirror 40, and an objective lens 42, coupled as shown. Slit illumination source 26 includes a light source 43, condenser lens 44, a variable aperture 45, a variable slit plate 46, a projection lens 47, and a mirror 48, coupled as shown. Console 32 includes a computer 50, a laser 52, and a user interface 54, coupled as shown.

As an overview, ophthalmic laser system 10 includes a laser device 16 (e.g., laser 52, laser fiber 34, and laser delivery head 22) and an ophthalmic microscope 18, which includes a slit lamp (e.g., oculars 20, objective lens 42, mirror 48, and slit illumination source 26). Operator eye 12 utilizes the optical path from oculars 20 through mirror 40, objective lens 42, and mirror 48 to view patient eye 14. A laser beam follows the laser path from laser 52 through laser delivery head 22 and mirror 48 to treat patient eye 14.

According to the overview, laser device 16 directs a laser beam comprising laser pulses towards a floater within eye 14. Ophthalmic microscope 18 gathers light reflected from within eye 14 to yield an image of eye 14. Laser beam multiplexer 39 multiplexes (e.g., splits or otherwise modulates) the laser beam into beams that form a cavitation bubbles in the vitreous, and may be any suitable multiplexer as described with reference to FIG. 1. Computer 50 instructs laser device 16 to direct the laser pulses towards the vitreous to form cavitation bubbles that create a bubble jet.

In more detail, in certain embodiments, oculars 20 allow operator eye 12 to view patient eye 14. Laser delivery head 22 delivers a laser beam of laser pulses from laser 52 through laser fiber 34 to patient eye 14. Laser 52 is any suitable laser that generates a laser beam as described with reference to FIG. 1. Zoom system 36 changes the spot size of the laser beam that exits fiber 34. Collimator 38 collimates the laser beam, and mirror 40 directs the beam through objective lens 42, which focuses the beam. Zoom system 36 and collimator 38 direct a parallel laser beam to mirror 40 to focus the laser beam onto the image plane of ophthalmic microscope 18. Mirror 40 may be a dichroic mirror that is reflective for the laser beam wavelength and transmissive for visible light.

Slit illumination source 26 of laser system 10 provides light that illuminates the surgical site of patient eye 14. Slit illumination source 26 includes light source 43, which emits light such as a high-intensity illumination light. Condenser lens 44 directs the light towards variable aperture 45 and variable slit plate 46. Variable aperture 45 defines the height of the light in the y-direction, and variable slit plate 43 defines the width of the light in the x-direction to form the light into a slit shape. Projection lens 47 directions the light towards prism mirror 48, which directs the slit of light into patient eye 14.

Base 30 supports laser delivery head 22 and slit illumination source 26. Joystick 28 moves base 30. Console 32 includes components that support the operation of system 10. Computer 50 of console 32 controls of the operation of components of system 10, e.g., base 30, laser delivery head 22, slit illumination source 26, laser 52, and/or user interface 54. User interface 54 communicates information between the operator and system 10.

FIG. 2B illustrates an example of a beam multiplexer comprising a beam doubler 60. Beam doubler 60 splits a laser beam into a plurality of beams, which are directed to objective lens 42. At objective lens 42, beams have different intensities I1, I2, which yield cavitation bubbles 8 (8a, 8b) of different diameters. In the example, intensity I1 is greater than intensity I2 and yields a bubble 8a with a greater diameter than that of bubble 8b. As described above, the direction of motion of the bubble jet is towards the smaller bubble. In other examples, cavitation bubbles 8 may have substantially the same diameter.

In the example, beam doubler 60 includes a wave plate 62, e.g., a half-wave plate, and a prism 64, e.g., a Wollaston prism. Wave plate 62 is an optical device that alters the polarization state of a light wave travelling through it. In the example, a half-wave plate shifts the polarization direction of linearly polarized light. Prism 64 is a transparent optical device with flat surfaces that refract light. At least one surface is angled (not parallel) to another surface. A Wollaston prism separates light into two orthogonally linearly polarized beams that yield two bubbles. Prism 64 may have any suitable separation, e.g., 0.2 to 5.0 degrees, to yield bubbles with any suitable bubble center separation, e.g., 0.1 to 3.0 millimeters (mm). For example, 2 millijoule (mJ) laser pulses yield bubbles with diameters of around 1.8 mm. A prism separation of 0.5 degrees results in a bubble center separation of 160 mm*sin (0.5)=1.4 mm, which is close enough to allow the bubbles to interact.

The intensity ratio $I_1/I_2$ of the bubbles (and thus the relative diameters of the bubbles) can be changed by adjusting, e.g., rotating, wave plate 62 and/or prism 64. That is, wave plate 62 can create cavitation bubble with different intensities and different diameters. Since the direction of the bubble jet is towards the smaller bubble, wave plate 62 may be used to adjust the direction of the bubble jet.

1.2 Floater Detection-Laser System

Figure 3:
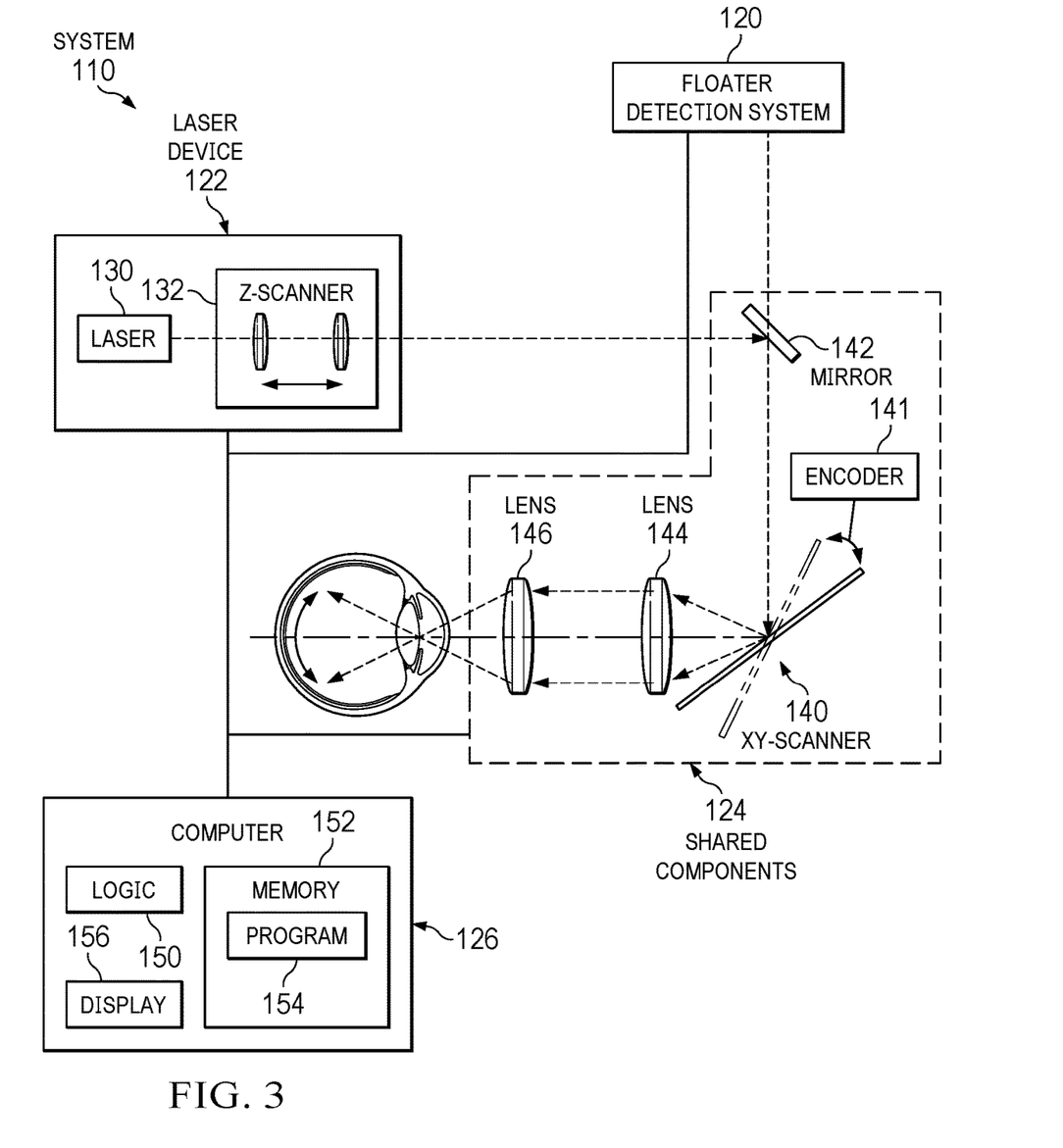
FIG. 3 illustrates an example of an ophthalmic laser surgical system with a scanner that can create cavitation bubbles to form a bubble jet, according to certain embodiments.

FIG. 3 illustrates an example of an ophthalmic laser surgical system 110 with a scanner that can create cavitation bubbles to form a bubble jet, according to certain embodiments. As an overview, system 110 includes a floater detection system 120, a laser device 122, one or more shared components 124, and a computer 126, coupled as shown.

Laser device 122 includes a laser 130 and a z-scanner 132, coupled as shown. Shared components 124 include an xy-scanner 140, an xy-encoder 141, and optical elements (such as a mirror 142 and lenses 144 and 146), coupled as shown. Computer 126 includes logic 150, a memory 152 (which stores a computer program 154), and a display 156, coupled as shown.

As an overview of operation of system 110, floater detection system 120 directs a detection beam along a detection beam path towards an eye and determines the location of the floater. Laser device 122 receives the z-location of the floater relative to the retina from the floater detection system and directs a laser beam along a laser beam path towards the z-location of the floater. Shared component xy-scanner receives the detection beam and directs the detection beam along the detection beam path towards the floater. Xy-scanner 140 also receives the laser beam from the laser device and directs the laser beam along the same detection beam path towards the floater.

Turning to the parts of the system, floater detection system 120 includes one or more detection devices that detect a floater in an eye. To detect a floater, a detection device directs a detection beam towards the eye, detects the beam reflected from the eye, and detects the floater using the reflected beam. The device may detect the floater from the reflected beam by sensing a change in the beam that indicates the presence of a floater or by generating an image of the floater or the floater's shadow on the retina ("floater shadow"), which may be displayed on display 156. The devices may utilize the same or different technologies, e.g., scanning laser ophthalmoscopy (SLO) and/or optical coherence tomography (OCT). One or more detection devices may provide the x, y, and/or z locations of the floater.

Laser device 122 includes laser 130, which generates a laser beam comprising laser pulses. Laser 130 may comprise any suitable laser as described with reference to FIG. 1, e.g., a femtosecond laser. Z-scanner 132 longitudinally directs the focal point of the laser beam to a specific location in the z-direction. In certain embodiments, laser device 122 includes a multiplexer that multiplexes a laser beam to yield multiple cavitation bubbles that create a bubble jet. The multiplexer may be any suitable multiplexer as described with reference to FIG. 1.

Shared components 124 direct detection and laser beams from floater detection system 120 and laser device 122, respectively, towards the eye. Because detection and laser beams both use shared components 124, both beams are affected by the same optical distortions. Accordingly, when the detection beam is used to aim the laser beam, the distortions are canceled out, which improves the accuracy of the laser beam. As an example of operation, mirror 142 directs a beam towards xy-scanner 140, which transversely directs the focal point of the laser beam in the x- and y-directions towards lens 144. Xy-scanner 140 may comprise any suitable scanner as described with reference to FIG. 1. Lenses 144 and 146 direct the beam towards eye. Xy-encoder 141 detects the position of xy-scanner 140 and reports the position in encoder units to floater detection system 120, laser device 122, and/or computer 26. Shared components 124 may also provide spectral and polarization coupling and decoupling of detection and laser beams to allow the beams to share the same path.

Computer 126 controls components of system 110 in accordance with computer program 154. For example, computer 126 controls components (e.g., floater detection system 120, laser device 122, and shared components 124) to detect a floater and focus a laser beam at the floater. Computer 126 may be separated from components or may be distributed among system 110 in any suitable manner, e.g., within floater detection system 120, laser device 122, and/or shared components 124. In certain embodiments, portions of computer 126 that control floater detection system 120, laser device 122, and/or shared components 124 may be part of floater detection system 120, laser device 122, and/or shared components 124, respectively.

2. Floaters

Figure 4:
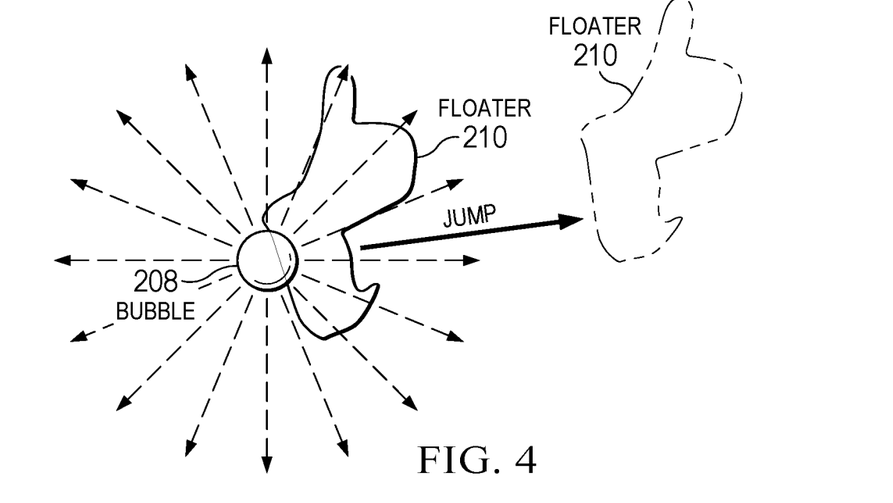
FIG. 4 illustrates an example of a laser pulse causing a floater to jump.

FIG. 4 illustrates an example of a laser pulse causing a floater 210 to jump. If the pulse hits the center of floater 210, the bubble fragments floater 210. However, if the pulse hits the periphery of floater 210, the bubble rapidly pushes floater 210, causing it to jump. If floater 210 jumps a distance of, e.g., 1 millimeter (mm), the laser will have to be redirected with the positioning device.

In certain embodiments, system 2 may create a laser pulse pattern that reduces the likelihood of causing a floater to jump. The pattern places pulses in the path where floater 210 could jump (e.g., outside the area of floater 210) in order to limit the movement of floater 210. That is, the coverage of the pulse pattern (i.e., the area enclosed by the outermost pulses of the pulse pattern) may be substantially centered about the centroid of floater 210 and may be larger than at least a majority of floater 210.

3. Bubble Jets

Figure 5:
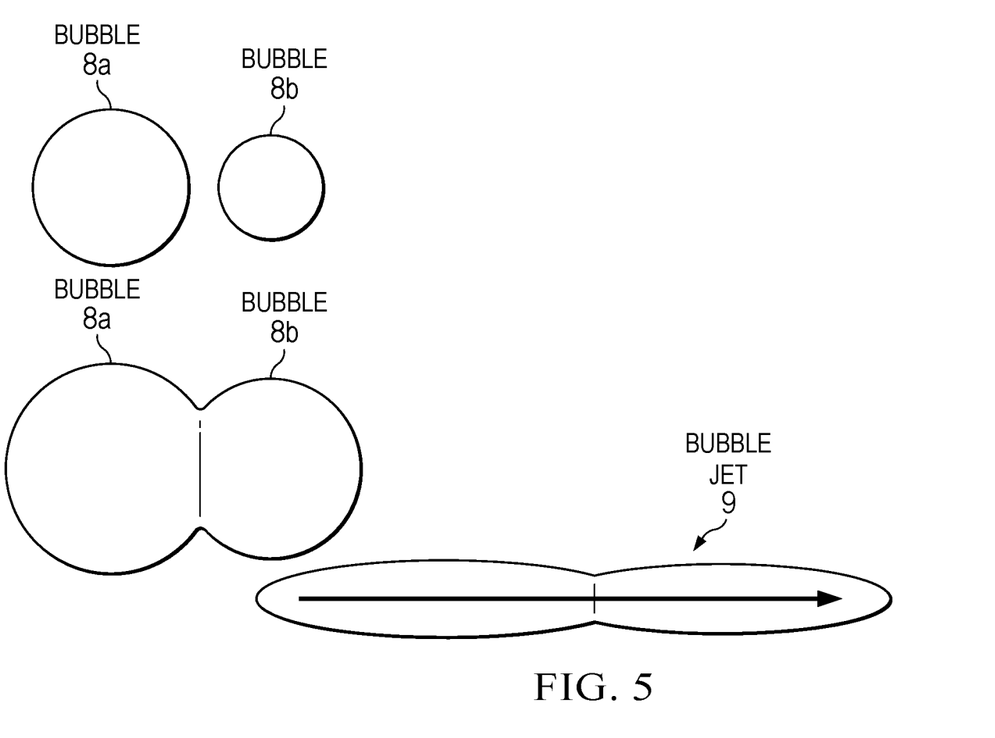
FIG. 5 illustrates an example of a bubble jet that may be created by the system of FIGS. 2A, 2B, and 3.

FIG. 5 illustrates an example of a bubble jet 9 that may be created by ophthalmic laser system 10 and 110 of FIGS. 2A, 2B, and 3. In the example, ophthalmic laser system 10 forms cavitation bubbles 8 that create bubble jet 9. For example, a low repetition rate (e.g., less than 3 pulses per second (pps)) laser device with a beam multiplexer may form bubble jet 9. Cavitation bubbles 8 include a larger bubble 8a and a smaller bubble 8b. The direction of motion of bubble jet 9 is towards smaller bubble 8b. The direction may be determined by a line drawn through the centers of bubbles 8, from the larger bubble 8a towards the smaller bubble 8b.

Figure 6:
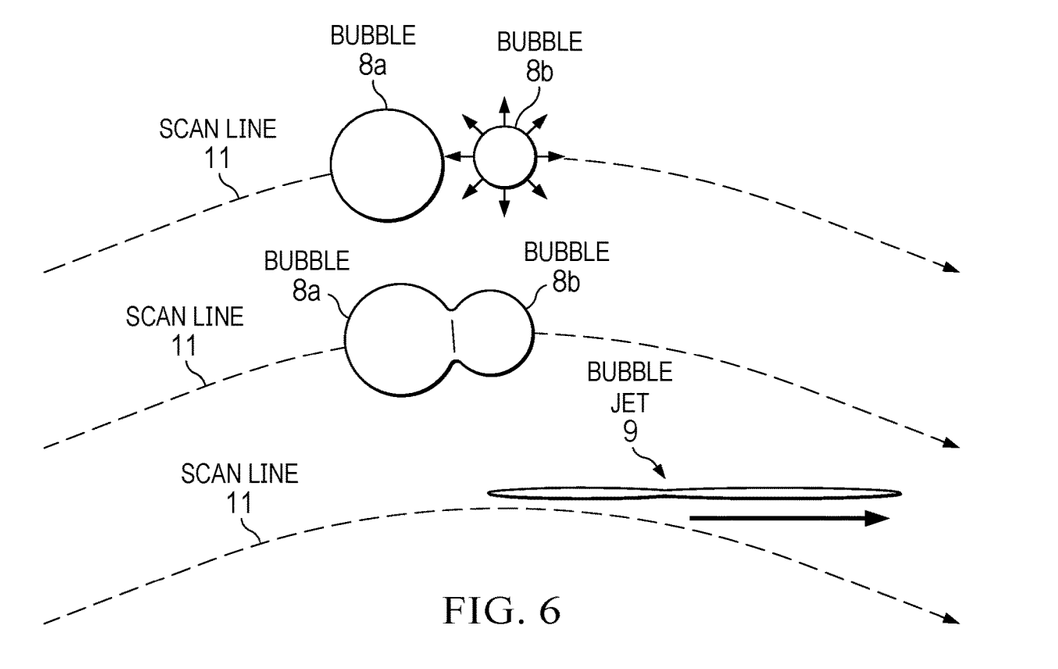
FIG. 6 illustrates an example of a bubble jet 9 that may be created by the system of FIGS. 2A, 2B, and 3.

FIG. 6 illustrates an example of a bubble jet 9 that may be created by ophthalmic laser system 10 and 110 of FIGS. 2A, 2B, and 3. In the example, ophthalmic laser system 10 creates cavitation bubbles 8 (8a, 8b) along a scan line 11 indicating where the scanner scans. Bubble 8b is created after bubble 8a at a distance where bubbles 8 can coalesce. Cavitation bubbles 8 interact to create a bubble jet 9 that propagates tangentially to the track of scan line 11.

Figure 7A:
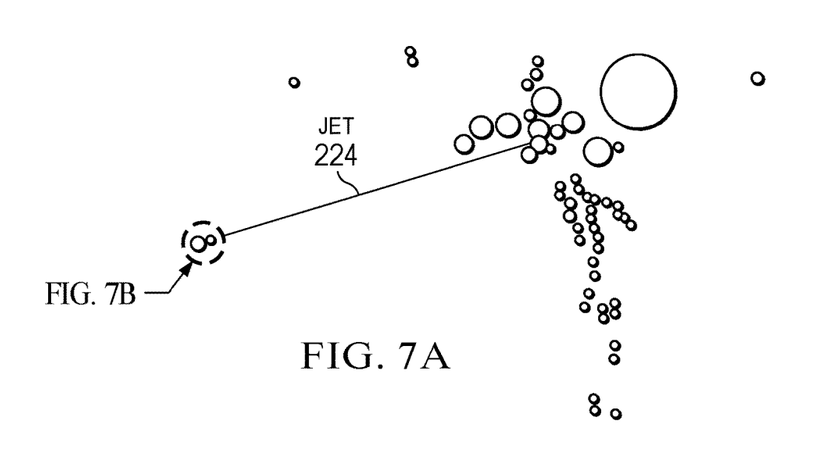
FIGS. 7A and 7B illustrate examples of a bubble jet resulting from cavitation bubbles of different diameters.
Figure 7B:
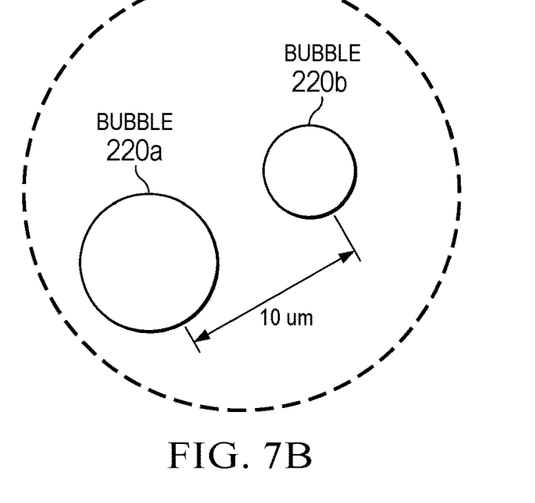

FIGS. 7A and 7B illustrate examples of a bubble jet 224 resulting from cavitation bubbles 220 (220a, 220b) of different diameters, where bubble 220a is larger than bubble 220b. Cavitation bubbles 220 (220a, 220b) maybe formed any suitable distance apart that allows bubbles 220 to interact, e.g., 5 to 20 microns, such as approximately 10 microns apart. Interaction between cavitation bubbles 220a and 220b form bubble jet 224 that flows towards the smaller bubble 220b.

4. Pulse Patterns

Figure 8:
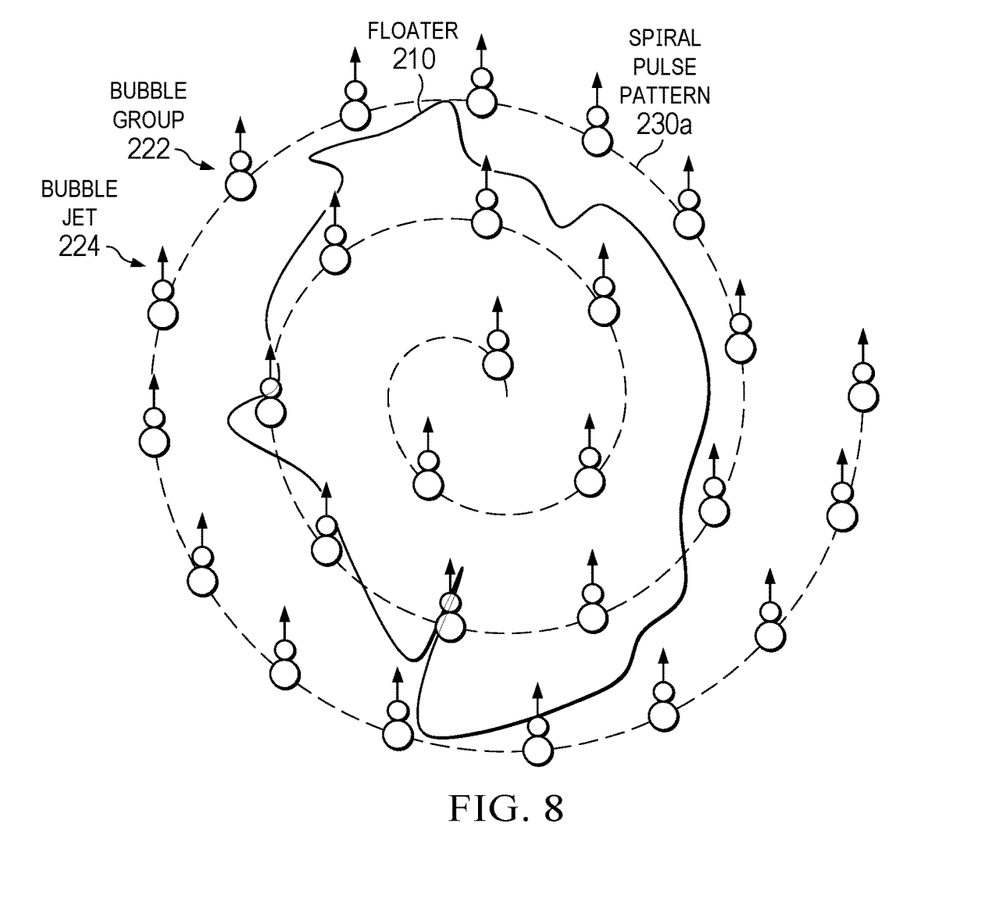
FIGS. 8 and 9 illustrate examples of enface pulse patterns that may be generated by the system of FIG. 1.
Figure 9:
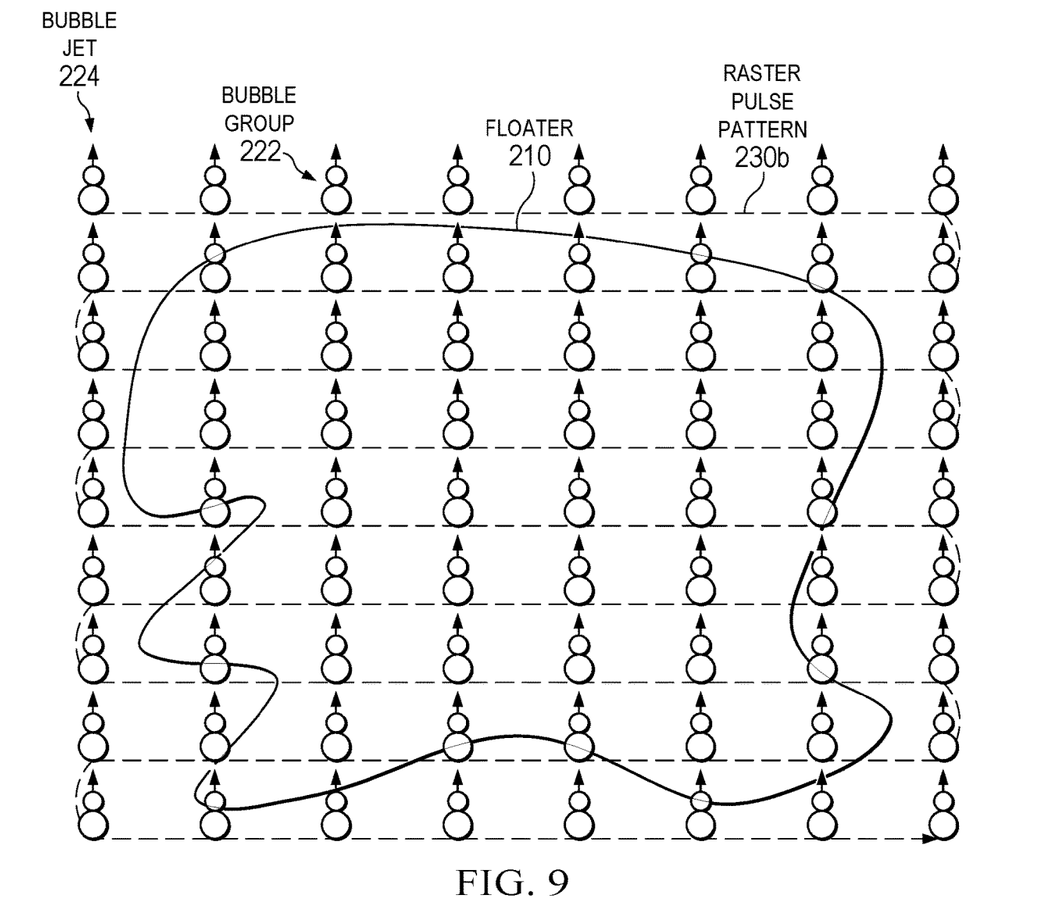

FIGS. 8 and 9 illustrate examples of enface pulse patterns 230 (230a and 230b) that may be generated by system 10 of FIG. 1. Pulse patterns 230 create bubble jets that fragment a floater and/or remove floater fragments. In the examples, pulse patterns 230 include pulse groups, where each pulse group yields a bubble group 222 with cavitation bubbles proximate to each other to create a bubble jet. Pulse patterns 230 may have any suitable size or shape in two- or three-dimensions, and a bubble group 222 may have any suitable number of bubbles. In certain embodiments, the enface coverage of a pattern 230 may cover the enface dimension of the floater. In certain cases (e.g., for a thick floater), multiple enface patterns 230 may be applied at different depths, yielding a three-dimensional pattern 230.

Pulse patterns 230 may be formed in any suitable manner. For example, a medium repetition rate (e.g., 100 Hz to 10 kHz) picosecond or femtosecond laser with a beam multiplexer can create a pulse pattern 230. In the example, the laser pulse energy per spot is 20 μJ, and the corresponding bubble oscillation period is T=13.3 us*$20^{1/3}$=36.1 μs. The repetition rate of 100 to 10 kHz corresponds to a pulse separation of 100 to 10,000 μs. In this example, the previous bubble group 222 disappears before the next pulse group arrives, so there is no interaction between the pulse group and the remains of the previous bubble group 222.

As another example, a high repetition rate (e.g., 40 to 150 kHz) picosecond or femtosecond laser with a beam multiplexer can create a pulse pattern 230. In the example, the pulse energy is 20 μJ per spot, the repetition rate is 40 kHz, and the pulse separation time is 25 μs. Thus, the next pulse group arrives when the previous bubble group 222 (or re-bouncing bubbles) still exist (or are living or alive). Under these conditions, different bubble groups 222 interact to yield a multi-group interaction, e.g., two groups of two bubbles yield a four-bubble interaction. The multi-group interaction creates bubbles jets to fragment a floater and/or remove floater fragments.

As another example, a high repetition rate (e.g., 40 to 150 kHz) laser creates a pulse pattern 230. In the example, pulse pattern is a spiral scan that starts at the center of the visual field to fragment a floater and move the floater fragments away from the visual field. The spiral has a large (e.g., 50 um) tangential spot separation, the laser pulse energy per spot is 20 μJ, and the corresponding bubble oscillation period is T=13.3 us*$20^{1/3}$=36.1 μs. The repetition rate of 40 to 150 kHz corresponds to a pulse separation of 6.67 to 25 us. Thus, the next pulse arrives when the previous cavitation bubble still exists to form a bubble jet. The direction of the jet is tangential to the spiral, and the length of the jet may be as long as several millimeters.

4.1 Spiral Pulse Patterns

FIG. 8 illustrates an example of a spiral pulse pattern 230a. Spiral pulse pattern 230a includes a spiral pattern of pulse groups that yield bubble groups 222, where each bubble group 222 is designed to yield a bubble jet 224. In the example, bubble jets 224 are created with jets pointing in the same direction to optimize the kinetic energy of bubble jets 224. Spiral pulse pattern 230a may be created with any suitable number of pulses (e.g., 10 to 1000 pulses), tangential spot separation (e.g., 2 to 100 μm), and radial spot separation (e.g., 2 to 200 μm).

4.2 Raster Pulse Patterns

FIG. 9 illustrates an example of a raster pulse pattern 230b. Raster pulse pattern 230b includes a raster pattern of pulse groups that yield bubble groups 222, where each bubble group 222 is designed to yield a bubble jet 224. In the example, bubble jets 224 are created with jets pointing in the same direction to optimize the kinetic energy of bubble jets 224. The raster pattern is formed by scanning in one direction to form a row of pulses, turning around at the end of the row, and then scanning in the opposite direction proximate to the previous row to form the next row of pulses. Raster pulse pattern 230b may be created with any suitable number of pulses (e.g., 10 to 1000 pulses), spot separation in the same row (e.g., 2 to 100 μm), and row separation (e.g., 2 to 200 μm).

5. Example Methods

Figure 10:
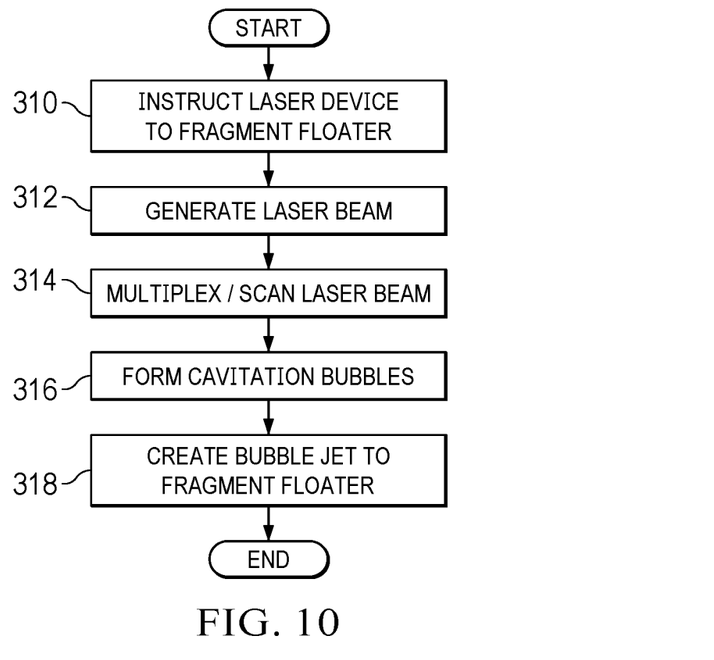
FIG. 10 illustrates an example of a method for creating a bubble jet to fragment a floater, which may be performed by the system of FIG. 1.

FIG. 10 illustrates an example of a method for creating a bubble jet to fragment a floater, which may be performed by system 10 of FIG. 1. The method starts at step 310, where a computer instructs a laser device to fragment the floater. The laser device generates a laser beam at step 312. The laser beam may comprise laser pulses such as femtosecond pulses. The laser beam is multiplexed and/or scanned at step 314 to yield multiple cavitation bubbles in the vitreous.

The laser pulses form cavitation bubbles at step 316 to create a bubble jet. The bubbles may have different (or the same) diameters. In certain embodiments, the cavitation bubbles are arranged to direct the bubble jet in a particular direction, e.g., in the direction of the smaller bubble. The cavitation bubbles create the bubble jet at step 318 to fragment the floater.

Figure 11:
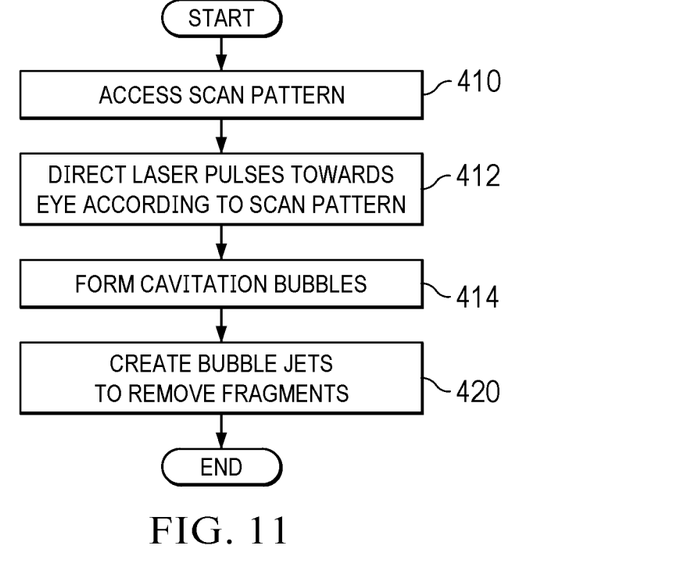
FIG. 11 illustrates an example of a method for creating bubble jets to remove floater fragments, which may be performed by the system of FIG. 1.

FIG. 11 illustrates an example of a method for creating bubble jets to remove floater fragments, which may be performed by system 10 of FIG. 1. The method starts at step 410, where a computer accesses a pulse pattern for a laser device. The pulse pattern may be designed to control the direction of the floater fragment removal. The computer instructs the laser device to direct laser pulses towards a floater according to the pulse pattern at step 412.

The pulses form cavitation bubbles at step 414. In certain embodiments, the cavitation bubbles are arranged to create bubble jets that point in one or more directions that facilitate removal of the fragments. The cavitation bubbles create bubble jets to remove floater fragments at step 420. The forces of the bubble jets move the fragments away from the visual axis. In addition, after some bubbles collapse, longer-living gas bubbles become entangled in the fragments and move them away from the visual axis.

A component (such as a control computer) of the systems and apparatuses disclosed herein may include an interface, logic, and/or memory, any of which may include computer hardware and/or software. An interface can receive input to the component and/or send output from the component, and is typically used to exchange information between, e.g., software, hardware, peripheral devices, users, and combinations of these. A user interface is a type of interface that a user can utilize to communicate with (e.g., send input to and/or receive output from) a computer. Examples of user interfaces include a display, Graphical User Interface (GUI), touchscreen, keyboard, mouse, gesture sensor, microphone, and speakers.

Logic can perform operations of the component. Logic may include one or more electronic devices that process data, e.g., execute instructions to generate output from input. Examples of such an electronic device include a computer, processor, microprocessor (e.g., a Central Processing Unit (CPU)), and computer chip. Logic may include computer software that encodes instructions capable of being executed by an electronic device to perform operations. Examples of computer software include a computer program, application, and operating system.

A memory can store information and may comprise tangible, computer-readable, and/or computer-executable storage medium. Examples of memory include computer memory (e.g., Random Access Memory (RAM) or Read Only Memory (ROM)), mass storage media (e.g., a hard disk), removable storage media (e.g., a Compact Disk (CD) or Digital Video or Versatile Disk (DVD)), database, network storage (e.g., a server), and/or other computer-readable media. Particular embodiments may be directed to memory encoded with computer software.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, or the operations of the systems and apparatuses may be performed by more, fewer, or other components, as apparent to those skilled in the art. As another example, modifications may be made to the methods disclosed herein. The methods may include more, fewer, or other steps, and the steps may be performed in any suitable order, as apparent to those skilled in the art.

To aid the Patent Office and readers in interpreting the claims, Applicants note that they do not intend any of the claims or claim elements to invoke 35 U.S.C. § 112(f), unless the words "means for" or "step for" are explicitly used in the particular claim. Use of any other term (e.g., "mechanism," "module," "device," "unit," "component," "element," "member," "apparatus," "machine," "system," "processor," or "controller") within a claim is understood by the applicants to refer to structures known to those skilled in the relevant art and is not intended to invoke 35 U.S.C. § 112(f).

What is claimed:

1. An ophthalmic laser system for treating a floater in a vitreous of an eye, comprising:
   a laser device;
   a floater detection system configured to detect the floater in the vitreous;
   an xy-scanner configured to:
      receive a detection beam from the floater detection system and direct the detection beam along a detection beam path towards a floater shadow cast by the floater on a retina of the eye; and
      receive a plurality of laser pulses from the laser device and direct the plurality of laser pulses along the detection beam path towards the floater shadow; and
   a computer comprising one or more processors and one or more memories storing instructions that, when executed by the one or more processors, cause the one or more processors to:
      access a three-dimensional pulse pattern for the plurality of laser pulses, the three-dimensional pulse pattern causing the laser device to:
         deliver a first laser pulse to a first location in the vitreous to yield a first bubble having a first size; and
         deliver a second laser pulse to a second location in the vitreous while the first bubble exists proximate the first location to yield a plurality of cavitation bubbles, including the first bubble having the first size and a second bubble having a second size, in the vitreous, wherein an interaction between the first bubble having the first size and the second bubble having the second size creates a bubble jet in the vitreous of the eye, each of the first laser pulse and the second laser pulse has a pulse energy of about 1 microjoule to about 20 microjoules, and the three-dimensional pulse pattern yields the plurality of cavitation bubbles including the first bubble and the second bubble and having a bubble center separation of 5 to 20 microns; and
      instruct the laser device to direct the plurality of laser pulses towards the floater according to the three-dimensional pulse pattern to create the bubble jet to treat the floater, wherein the first location in the vitreous and the second location in the vitreous are outside of the floater, and a direction of motion of the bubble jet is towards the floater.

2. The ophthalmic laser system of claim 1, the computer configured to instruct the laser device to direct the plurality of laser pulses towards the floater by instructing the laser device to:
   create a first cavitation bubble with a first diameter; and
   create a second cavitation bubble with a second diameter, the second diameter different from the first diameter.

3. The ophthalmic laser system of claim 1, the computer configured to instruct the laser device to direct the plurality of laser pulses towards the floater by instructing the laser device to:
   direct the plurality of laser pulses to form the plurality of cavitation bubbles arranged to direct the bubble jet in a particular direction.

4. The ophthalmic laser system of claim 1, the three-dimensional pulse pattern comprising a plurality of pulse groups, each pulse group configured to yield a set of cavitation bubbles that form a bubble jet.

5. The ophthalmic laser system of claim 1, the three-dimensional pulse pattern yielding the plurality of cavitation bubbles arranged in a spiral enface pattern.

6. The ophthalmic laser system of claim 1, the three-dimensional pulse pattern yielding the plurality of cavitation bubbles arranged in a raster enface pattern.

7. The ophthalmic laser system of claim 1, the floater detection system configured to determine a location of the floater in the vitreous of the eye.

8. The ophthalmic laser system of claim 1, the laser device comprising:
   a laser configured to generate a laser beam; and
   a beam multiplexer configured to split the laser beam into the plurality of laser pulses that form the plurality of cavitation bubbles to create the bubble jet.

9. A method for treating a floater in a vitreous of an eye with an ophthalmic laser system, comprising:
   directing, via a laser device of the ophthalmic laser system, a plurality of laser pulses towards the floater in the vitreous of the eye, wherein the laser device directs the plurality of laser pulses towards the floater according to a three-dimensional pulse pattern to create a bubble jet to treat the floater;
   detecting, via a floater detection system of the ophthalmic laser system, the floater in the vitreous;
   receiving, via an xy-scanner of the ophthalmic laser system, a detection beam from the floater detection system and directing the detection beam along a detection beam path towards a floater shadow cast by the floater on a retina of the eye;
   receiving, via the xy-scanner, the plurality of laser pulses from the laser device and directing the plurality of laser pulses along the detection beam path towards the floater shadow;
   accessing, via a computer, the three-dimensional pulse pattern for the plurality of laser pulses, the three-dimensional pulse pattern causing the laser device to:
      deliver a first laser pulse to a first location in the vitreous to yield a first bubble having a first size; and
      deliver a second laser pulse to a second location in the vitreous while the first bubble exists proximate the first location to yield a plurality of cavitation bubbles, including the first bubble having the first size and a second bubble having a second size, in the vitreous, wherein an interaction between the first bubble having the first size and the second bubble having the second size creates the bubble jet in the vitreous of the eye, each of the first laser pulse and the second laser pulse has a pulse energy of about 1 microjoule to about 20 microjoules, and the three-dimensional pulse pattern yields the plurality of cavitation bubbles including the first bubble and the second bubble and having a bubble center separation of 5 to 20 microns; and instructing, via the computer, the laser device to direct the plurality of laser pulses towards the floater according to the three-dimensional pulse pattern to create the bubble jet to treat the floater, wherein the first location in the vitreous and the second location in the vitreous are outside of the floater, and a direction of motion of the bubble jet is towards the floater.

* * * * *